(12) United States Patent
Morein

(10) Patent No.: US 6,429,876 B1
(45) Date of Patent: Aug. 6, 2002

(54) METHOD AND APPARATUS FOR VIDEO GRAPHICS ANTIALIASING WITH MEMORY OVERFLOW OPTIMIZATION

(75) Inventor: Stephen L. Morein, Cambridge, MA (US)

(73) Assignee: ATI International SRL, Barbados (BB)

( * ) Notice: Subject to any disclaimer, the term of this patent is extended or adjusted under 35 U.S.C. 154(b) by 0 days.

(21) Appl. No.: 09/316,438

(22) Filed: May 21, 1999

Related U.S. Application Data

(63) Continuation-in-part of application No. 09/141,797, filed on Aug. 28, 1998.

(51) Int. Cl.[7] .................. G06T 5/00; G09G 5/00
(52) U.S. Cl. .................. 345/611; 345/531; 345/536; 345/565
(58) Field of Search .................. 345/611, 613, 345/614, 501–503, 520, 531, 536, 545, 555, 564, 572

(56) References Cited

U.S. PATENT DOCUMENTS

| | | | | |
|---|---|---|---|---|
| 5,651,104 A | * | 7/1997 | Cosman | 345/428 |
| 5,841,447 A | * | 11/1998 | Drews | 345/563 |
| 5,854,631 A | * | 12/1998 | Akeley et al. | 345/419 |
| 5,990,904 A | * | 11/1999 | Griffin | 345/631 |
| 6,128,000 A | * | 10/2000 | Jouppi et al. | 345/589 |
| 6,188,394 B1 | * | 2/2001 | Morein et al. | 345/555 |
| 6,204,859 B1 | * | 3/2001 | Jouppi et al. | 345/431 |
| 6,313,838 B1 | * | 11/2001 | Deering | 345/420 |

OTHER PUBLICATIONS

P. Haeberli and K. Akeley, "The Accumulation Buffer: Hardware Support for High–Quality Rendering", Computer Graphics, vol. 24, No. 4, Aug. 1990, pp. 309–318.*

N. P. Jouppi and Chun–Fa Chang, Z3: An Economical Hardware Technique for High–Quality Antialiasing and Transparency, Proceedings of the 1999 Eurographics/SIGGRAPH workshop on Graphics hardware Jul. 1999, pp. 85–93.*

J. Painter and K. Sloan, "Antialiased Ray Tracing by Adaptive Progressive Refinement", Computer Graphics, vol. 23, No. 3, Jul. 1989, pp. 281–288.*

S. Winner, M. Kelley, B. Pease, B. Rivard, and A. Yen, "Hardware Accelerated Rendering of Antialising Using A Modified A–buffer Algorithm", Proceedings of the 24th annual conference on Computer graphics & interactive techniques Aug. 1997, pp. 307–316.*

* cited by examiner

*Primary Examiner*—Ulka J. Chauhan
(74) *Attorney, Agent, or Firm*—Vedder, Price Kaufman & Kammholz

(57) ABSTRACT

A method and apparatus for antialiasing in a video graphics system is accomplished by determining if a pixel sample set, which results from oversampling, can be reduced to a compressed sample set, where the compressed sample set contains information describing a corresponding pixel. When the pixel sample set can be reduced to a compressed sample set, the compressed sample set is stored in a frame buffer at a location corresponding to the particular pixel that the sample set describes. When the pixel sample set cannot be reduced to a compressed sample set, a pointer is stored at the frame buffer location corresponding to the particular pixel. The pointer points to a selected address in a sample memory at which the complete sample set for the pixel is stored. When the sample memory reaches capacity, storage of the complete sample set in the sample memory is reduced to a subset of the complete set, allowing all pixels in each frame to be accommodated, but removing the loss-less characteristic of the compression technique.

19 Claims, 5 Drawing Sheets

METHOD AND APPARATUS FOR VIDEO GRAPHICS ANTIALIASING WITH MEMORY OVERFLOW OPTIMIZATION

RELATED APPLICATIONS

This application is a continuation in part of application Ser. No. 09/141,797 entitled "METHOD AND APPARATUS FOR VIDEO GRAPHICS ANTIALIASING" which was filed on Aug. 28, 1998.

FIELD OF THE INVENTION

The invention relates generally to video graphics processing and more particularly to a method and apparatus for video graphics antialiasing that is configured to perform in a limited memory environment.

BACKGROUND OF THE INVENTION

Computers are used in many applications. As computing systems continue to evolve, the graphical display requirements of the systems become more demanding. This is especially true in applications where detailed graphical displays must be updated quickly. In many applications that utilize such detailed graphical displays, maintaining the detail of the display can consume vast amounts of memory storage space and processor bandwidth.

Computer displays and other high resolution display devices such as high definition televisions (HDTV), projectors, printers, plotters, and the like, present an image to the viewer as an array of individual picture elements, or pixels. The individual pixels are each given a specific color, which corresponds to the color of the image at the location of the particular pixel. The pixels are closely spaced, and the viewer's visual system performs a filtering of the individual pixel colors to form a composite image. If the partitioning of the image into individual pixel elements is performed properly, and the pixels are close enough together, the viewer perceives the displayed array of pixels as a virtually continuous image. Despite the views visual filtering, the viewer remains sensitive to aberrations in the image, and video graphic systems must be designed to minimize these aberrations.

In many systems, graphical images for display are sampled, and the image is regenerated based on the stored samples. When the conservation of the detail is important, oversampling is typically utilized in order to avoid aliasing in the reconstructed graphical image. Oversampling techniques are well known in the art. In an oversampling system, multiple samples of each screen element, or pixel, are stored. Although each pixel is rendered using only a single color value, each of the samples for that particular pixel are used in generating the final color. In effect, a much more detailed, or higher-resolution, version of the image is stored within the computer, and this version is used to generate each of the colors for the pixels displayed on the screen.

Conventional oversampling systems in video graphics systems can require huge amounts of memory. For example, if a system stores 8 samples for each particular pixel in memory and each sample includes 16 bits of color information and a 16-bit depth, or "Z", value, the memory requirements for a high-quality image which is 640×480 pixels is nearly 10 million bytes. The disadvantages of this amount of memory usage are apparent. First, the memory for such storage must be provided. Second, the memory accesses required to store and retrieve the data can consume large amounts of bandwidth within the computing system.

Consequently, a need exists for an antialiasing technique that makes more efficient use of memory resources.

DETAILED DESCRIPTION OF A PREFERRED EMBODIMENT OF THE INVENTION

Generally, the present invention provides a method and apparatus for antialiasing in a video graphics system. This is accomplished by determining if a pixel sample set, which results from oversampling, can be reduced to a compressed sample set, where the compressed sample set contains information describing a corresponding pixel. When the pixel sample set can be reduced to a compressed sample set, the compressed sample set is stored in a frame buffer at a location corresponding to the particular pixel that the sample set describes. When the pixel sample set cannot be reduced to a compressed sample set, a pointer is stored at the frame buffer location corresponding to the particular pixel. The pointer points to a selected address in a sample memory at which the complete sample set for the pixel is stored. By compressing pixel sample sets when possible, a loss-less system, which uses fewer memory resources, is achieved. When the sample memory reaches capacity, storage of the complete sample set in the sample memory is reduced to a subset of the complete set, allowing all pixels in each frame to be accommodated, but removing the loss-less characteristic of the compression technique.

In a video graphics system that employs oversampling, each pixel in the system is described by a number of samples. These samples are combined to produce a resultant color value for the particular pixel. In the preferred embodiment, each pixel is described by eight samples, but any number of samples can be used. It should be understood that there is a tradeoff between the accuracy achieved with additional samples and the costs of processing and storing those additional samples.

Each sample consists of a color and a Z value. The Z value of a sample determines where the sample is positioned depth-wise in relation to other samples. This allows for one shape or image to be spatially positioned in front of another. Z values are preferably represented with 16-bits, but it is understood that other bit quantities may be used to describe the depth of a particular pixel. Similarly, it is preferable that each color is represented by a 16-bit value. It should be obvious that more or fewer colors may be represented by using a different number of bits. The complete set of samples that describes a particular pixel represents a complete pixel sample set.

Figure 1:
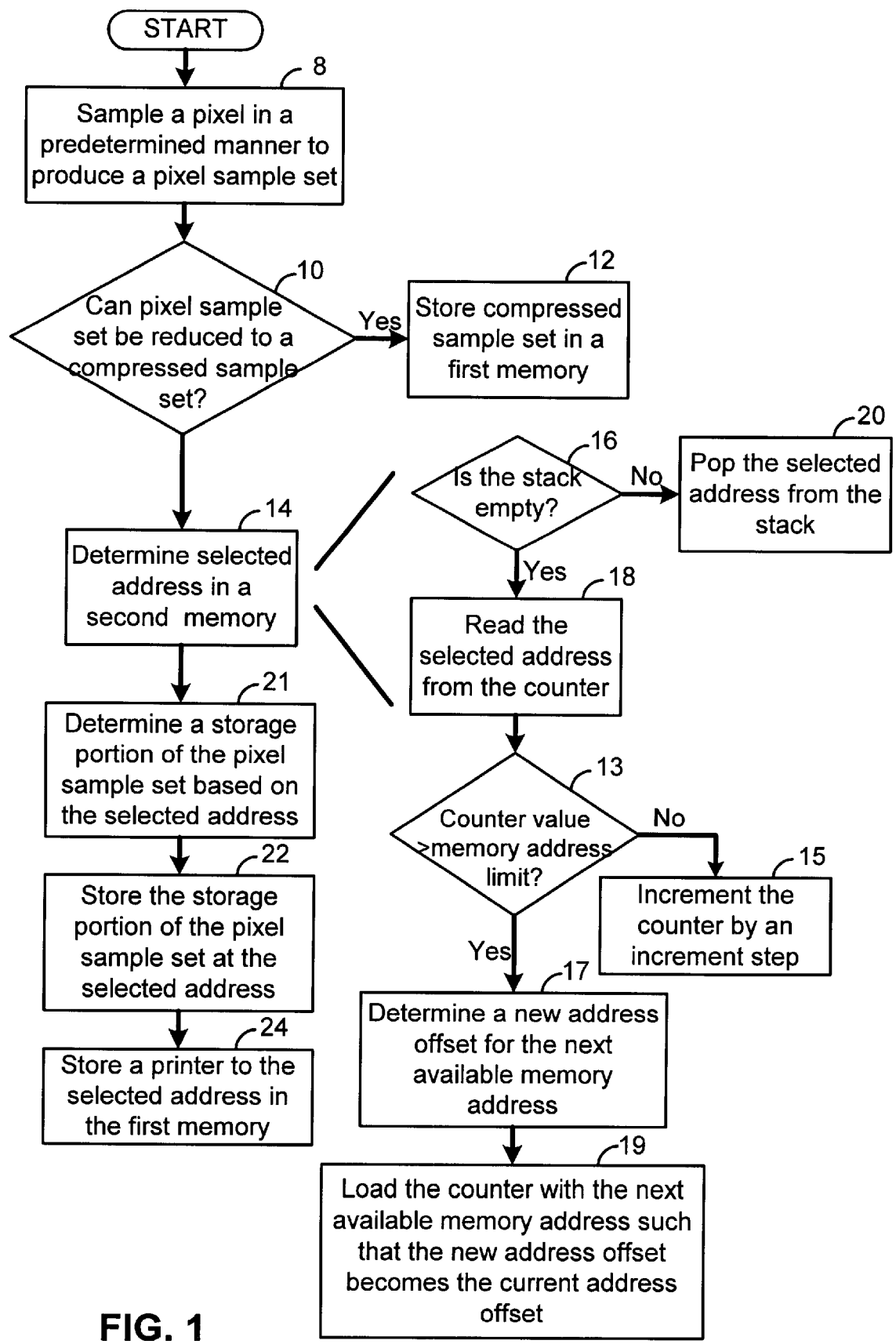
FIG. 1 illustrates a flow chart of a method for storing antialiasing pixel data in accordance with the present invention.

The present invention can be better understood with reference to FIGS. 1–6. FIG. 1 illustrates a flow chart of a method for storing antialiasing pixel data. At step 8, the pixel is sampled in a predetermined manner to produce the pixel sample set for the pixel. Preferably, the predetermined manner allows for the omission of some of the pixel samples from the sample set while still maintaining a reasonably accurate sample set for the pixel. One manner that can be utilized to achieve this is to sample the pixel in a pattern that sequentially spreads the samples throughout the pixel. Thus, in an eight-sample sampling, the first four samples may come from each of the four quadrants of the pixel, where the remaining samples provide secondary samples in each of the quadrants. This sampling order is performed in anticipation that some samples may eventually be thrown away, and placing the samples in a specific order allows the discarding of some samples to be performed in a simpler way while still ensuring a valid sample set remains.

At step 10, it is determined whether or not the pixel sample set can be reduced to a compressed sample set. Preferably, the compressed sample set consists of two color and Z value pairs and a mask that determines which samples of the set use each color/Z value combination. For example, if a pixel has the edge of a shape passing through it, samples describing the pixel will either be in the area covered by the shape (having a first color and Z) or in the area where the background is exposed (having a second color and Z). The method realizes that this situation arises often, and that it is wasteful to store all of the samples when there are really only two different color and Z values. Therefore, when it is possible, instead of storing all eight samples, each having a color and Z value, the method compresses the eight samples to two samples (two color and two Z values) and a mask that describes which of the eight normally stored samples are covered by each the two stored samples.

Continuing with the example, if the shape covers samples 0, 3, and 4 of the pixel, the mask may have the binary representation 00011001. In this mask, the binary number 0 corresponds to samples that have the background color and Z values, while a value of 1 corresponds to samples having the color and Z values of the shape. It should be apparent that these can be interchanged and the mask inverted. Thus, if two or fewer color and Z values can represent all of the samples of the pixel sample set, the sample set can be compressed to a compressed sample set that includes the color and Z values along with a mask.

If it is determined at step 10 that the pixel sample set can be reduced to a compressed sample set, at step 12, the compressed sample set is stored in a primary memory at a memory location that corresponds to that particular pixel. Preferably, the primary memory is arranged such that each pixel has a corresponding set of memory locations that may be used to store the compressed sample set. The storage system for a particular pixel may be:

<Mask (8 bits), Color1 (16 bits), Z1 (16 bits), Color2 (16 bits), Z2 (16 bits)>

Thus, each pixel is allocated nine bytes in the primary memory, which in the preferred embodiment is local memory such as the frame buffer of the video graphics system. The frame buffer is memory that has fast access time, but is of limited size.

If it is determined at step 10 that the sample set cannot be reduced to a compressed sample set, at step 14, a selected address in a secondary memory is determined for storage of the complete sample set. Preferably, this secondary memory is larger than the frame buffer, or primary memory, such that it can store a plurality of such sample sets. The secondary memory, or sample memory, may include non-local memory, such as main memory that is accessed through a bus.

The address selection of step 14 may be determined as illustrated in steps 13 and 15–20. At step 16, it is determined if a stack is empty, where the stack that stores released memory locations in the secondary memory. A released memory location is created when a sample set that was stored in the secondary memory is altered such that it can be reduced to a compressed sample set. At that point, the compressed sample set will be stored in the frame buffer, and the locations used by the sample set in the secondary memory will be released and can be reused to store other samples. If, at step 16, the stack is determined to be non-empty (i.e. it contains at least one released location), the method proceeds to step 20, and the selected address is determined by popping a released location from the stack.

If the stack is determined to be empty at step 16, or if a stack is not included in the system for storing released memory locations, the selected address is determined at step 18 by reading a counter value. The counter monitors storage in the secondary memory and increments as pixel data is stored in the memory. The counter contains the next free location in the memory. It should be apparent to one skilled in the art that the overall system may be implemented with the counter alone. Without the stack, released locations may either be reused through some other means, or they may be ignored and the system can reclaim them periodically through a reclamation or refresh routine.

In many cases, the secondary memory is of limited size and there is a risk that not enough memory will exist to fully accommodate an entire frame of pixels when a large number of the pixels cannot be reduced to a compressed sample set. In such instances, one option is to reduce the precision with which the oversampling is maintained. This is simply accomplished by only storing a portion of the sample set for those pixels that require storage in the secondary memory.

Because the sampling performed at step 8 was performed in a predetermined manner that preferably orders the pixels based on their contribution to the overall pixel sample set, discarding the last four pixel samples in an eight sample set should leave four pixel samples that are a valid representation of the pixel. By organizing storage of the pixel sample sets in the memory such that when the limits of the memory are reached, portions of subsequent pixel sample sets overwrite portions of the sample sets already stored in the memory, the number of samples for each set can be uniformly maintained.

At step 13, it is determined if the counter value has reached a memory address limit that indicates that the limitations of the memory have been reached. Preferably, the memory address limit is reached when the last available address, or entry, is retrieved from the counter. If the limit has not yet been reached, the counter is incremented at step 15. In a system that stores eight samples per pixel in the sample, or secondary memory, where each sample includes a 16-bit Z value and a 16-bit color value, the increment will be 32 bytes, or eight sample locations for the initial group of sample sets stored in the memory.

If it is determined at step 13 that the counter has exceeded the memory address limit, a new address offset is determined at step 17 for the next available memory address. At step 19, the counter is loaded with the next available memory address such that the address offset of the counter reflects the new address offset. After the initial group of sample sets has filled the memory with eight samples per pixel using the initial address offset, the new address offset will be determined such that the next available address will correspond to the latter half of the first entry in the memory. Because the counter will indicate the new address offset, the entity storing subsequent sample set will detect the new offset and only write the four most-significant samples rather than a set of eight samples as was initially stored in the memory. The new sets of four samples will overwrite the four least significant samples of the older entries in the memory. When the sample sets are retrieved for use, the address offset indicated by the counter will determine the number of samples that should be retrieved.

Figures 5, 6:
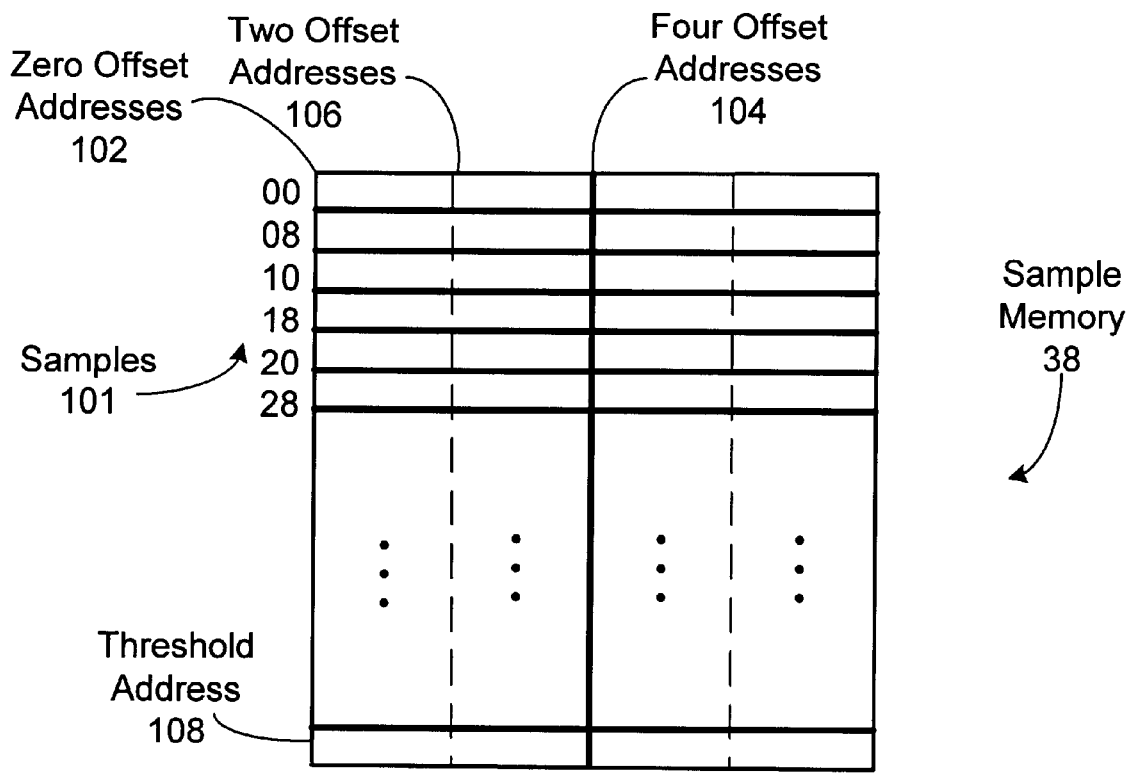
FIG. 5 illustrates a block diagram of a memory structure as addressed in accordance with the present invention.
FIG. 6 illustrates divisions within a counter value utilized to address the memory of FIG. 5.

This reduction in samples per sample set can be better understood with reference to FIGS. 5 and 6. FIG. 5 illustrates a sample, or secondary memory 38. The sample memory 38 includes a plurality of address locations, and the numbers along the left side of the memory indicate the sample address for each memory location. Thus, the memory begins at sample address 00. If each sample set initially includes eight samples, the next entry in the memory will begin with sample address 08, as samples 00–07 were used by the first entry. Initially, sample sets are stored in the memory at entries corresponding to the zero address offset addresses 102. In the example, if each entry stores eight samples, the counter that provides the addresses will increment by eight each time it is read.

The counter value 130 corresponding to the addresses of entries in the memory is shown in FIG. 6. The counter value 130 includes a number of higher order bits 128 and less significant bits 126–120. Preferably, the bit 120 corresponds to an addressing granularity of one sample such that even though a sample may include four bytes of data or more, the bit 120 will only switch values on sample boundaries. In the initial storage sequence where eight samples are stored per pixel, bits 124–120 will all be zero. Providing these bits to an AND gate or similar circuitry can be used to determine that the current mode of the system is to store eight samples per pixel. The address indicated by the higher order bits 128 and the bit 126 will increment with each entry as the memory 38 is filled with sample sets.

When the counter reaches or exceeds the threshold address 108, indicating that the addressing has reached the boundaries or limits of the memory 38, the counter will be reset to a new value corresponding to the first address of the four offset addresses 104. The counter value 130 is loaded with a value such that bit 124 is now set. Having this bit 124 set and the next less significant bits 122 and 120 not set indicates that storage in the memory 38 is being done on a four sample per sample set basis. Therefore, based on these bits, data should be written to or read from the memory in four sample sets. Note that when the next sample set is written to the memory 38, the four most significant samples will be written in the right most half of the top row illustrated. These samples will replace the four least significant samples of the sample set stored at the first zero offset address. Once the initial four-offset address has been read, the counter will increment by eight samples to reach the next available address.

If, after storing four samples per sample set, the memory is once again filled to the point where the threshold address 108 is exceeded, the memory can be divided yet again such that only two samples are maintained for each sample set. The first address of the two offset addresses 106 could be loaded into the counter, and the bits in the counter once again tested to determine the mode of storage currently supported in the memory 38. Note that an offset of six could be employed if the offset of two does not provide enough entries to satisfy the needs of a particular frame.

Loading of the new values into the counter may be accomplished through simple circuitry that checks the current value of the counter and either increments the value or loads in a value that contains a new address offset. By initially storing a full complement of eight samples per sample set and only replacing the less significant portions of these sets when necessary, the system is able to adapt on a frame by frame basis to provide the maximum level of sampling resolution. If the memory does not provide adequate space for sample storage with eight samples stored per pixel, some sampling resolution can be compromised to allow for each pixel to be represented. The use of a counter to indicate both the next available entry and also the mode of storage (how many samples per sample set) provides an efficient means to accomplish the storage of the sample sets.

Returning to FIG. 1, once the selected address has been determined at step 14, the method proceeds to step 22, and the pixel sample set is stored at the selected address. As just described, the pixel sample set includes a number of color and Z value pairs equal to the number of samples that the memory is currently supporting. Such a number will be determined by examining the bits in the counter—whether the address was provided by the counter or the stack. No mask is needed because the ordering of the storage determines which color/Z pair describes each sample.

At step 24, a pointer is stored in the primary memory at the location corresponding to the pixel which the sample set that has been stored in the secondary memory describes. Note that the pointer may be stored after the selected address has been determined and storage of the pointer is not dependent on the actual storage of the samples. This pointer points to the location in the secondary memory where the sample set is stored. When the time to use the data arises, it is determined whether a compressed sample set or a pointer is stored in the primary memory for a particular pixel, and then the data can be retrieved based on that determination. If samples are to be retrieved from the secondary, or sample memory, the counter must be referenced to determine how many samples are included in the sample memory for each pixel.

The presence of a pointer in the primary memory rather than a compressed sample set can be communicated with a flag, or alternatively, the data structure used to store compressed sample sets can be exploited to indicate a pointer is stored. The mask for a compressed sample set will be a mixture of binary 1's and 0's if the pixel is covered by samples having two color and a Z values. If the pixel can be fully described by a single color and Z value (i.e. the entire pixel is covered by a single shape), this can be indicated in two different ways. In the first case, the mask can be set to all 1's, and the color and Z are stored in the color and Z locations that correspond to the mask value of 1. In the second case, the mask can be set to all 0's, and the color and Z stored in the color and Z locations that correspond to the mask value of 0. Both of these options produce identical results.

Preferably, one of the two options described above is used exclusively for single-color pixels, and the other is set aside to indicate that the storage space in the primary memory is being used to store a pointer rather than a compressed sample set. For example, if the mask contains all 0's, the pixel is assumed to be solid (covered by a single color/Z), and the color and Z values are stored in the appropriate color/Z pair of the primary memory. If the mask contains all 1's, this indicates that the remaining bytes store a pointer to the secondary memory.

The pointer may be stored in the primary memory in many formats. In one format, the low 16 bits of the address to which the pointer points are stored in the bits normally used for one color, and the high 16 bits of the address are stored in the place of the other color. In such a system, the Z value for one of the color/Z value pairs may be used to store the closest Z value of all of the samples in the secondary memory. This additional use of the primary memory space may allow for some video graphics processing without having to access the secondary memory. For example, if a fragment is later merged with this pixel, and the fragment completely covers the pixel and has a closer Z value than that stored in the primary memory, it can be assumed that the fragment completely covers the samples in the secondary memory and should replace them. Alternatively, the farthest Z value of the secondary memory samples may be stored in the primary memory, and a fragment that has a Z value farther than this can be disregarded. Both of these Z values may be stored if there is sufficient memory allocated to each pixel in the primary memory.

Thus, in one embodiment, the primary memory entry for a may look like:

| Size | Mask is not all 1's (Compressed Sample in Primary Memory) | Mask is all 1's (Indicates Pointer Stored in Primary Memory) |
|---|---|---|
| 8 bits | mask | 11111111 |
| 16 bits | first color | low 16 address bits of pointer |
| 16 bits | first Z | closest Z value of samples |
| 16 bits | second color | high 16 address bits of pointer |
| 16 bits | second Z | farthest Z value of samples |

In an alternate embodiment, the compressed samples stored in the primary memory may consist of three color/Z pairs and two masks. In such an embodiment, the presence of 1's or 0's in the first mask would indicate which samples are covered by the first color/Z pair by the presence of either 1's or 0's in the mask. The second mask would indicate sample coverage for the second color/Z pair in the same manner. A combination of the first and second mask could then be used to determine which samples are not covered by the first or second color/Z pairs, and therefore are covered by the third color/Z pair. For example, if coverage of the first and second color/Z pairs are indicated by 1's in the first and second masks, a bit-wise AND of these masks produces a result that would have 0's in the bit positions where the third color/Z pair is applied. Similarly, compressed sample set configurations having other than two or three color/Z pairs should be apparent to one skilled in the art.

By storing compressed sample sets in a primary, local memory when possible, and when compression is not possible, storing at least a portion of the sample set in non-local memory with a pointer in local memory, the amount of total memory required to implement an oversampling system can be greatly reduced. If the secondary, non-local memory is large enough to store all of the required complete sample sets for a frame, no information loss occurs. Information loss that occurs when the non-local memory is too small to support the number of pixels requiring non-compressed sample sets is limited to a reduction in the sampling granularity for each pixel.

Figure 2:
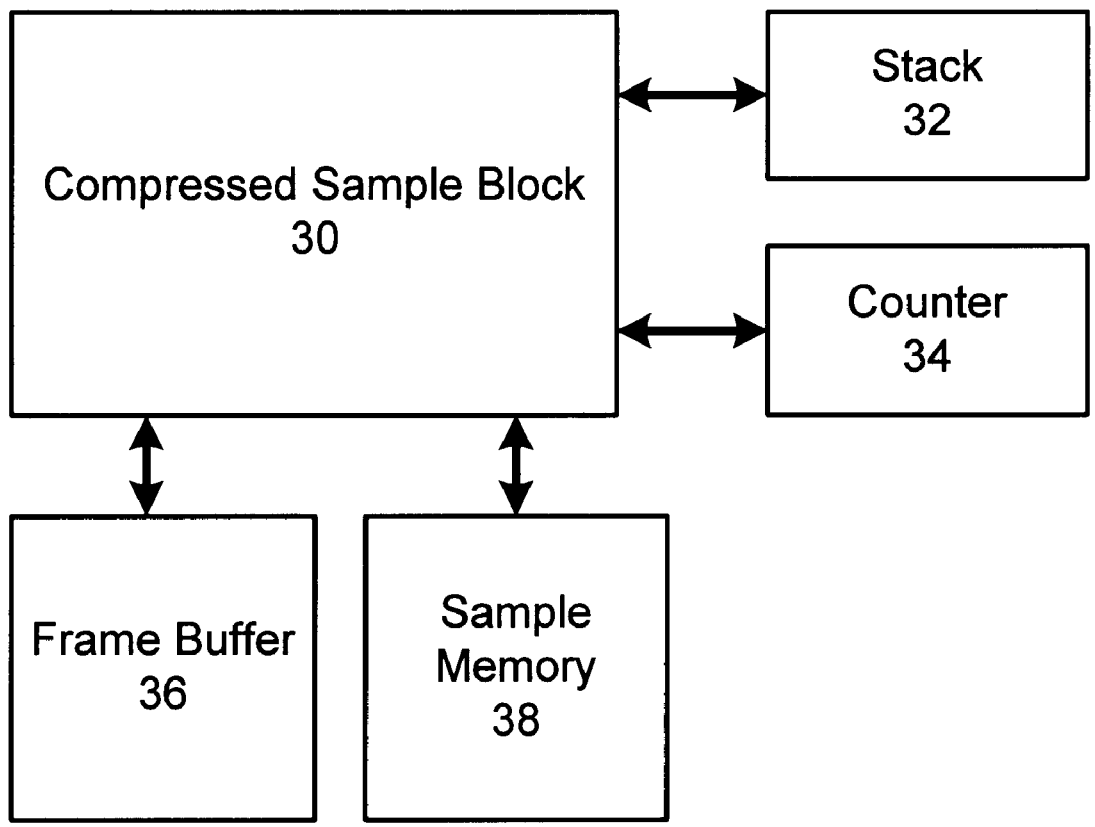
FIG. 2 illustrates a block diagram of an apparatus for display antialiasing in accordance with the present invention.

FIG. 2 illustrates an apparatus for display antialiasing. The apparatus includes a frame buffer 36, a sample memory 38, a counter 34, and a compressed sample block 30. The compressed sample block 30 determines whether pixel data can be described, or summarized, with compressed sample sets. The compressed sample block 30 then controls the storage of the sample sets in the frame buffer 36 and the sample memory 38. The sample memory 38 stores a plurality of pixel entries, and each of the pixel entries stores the plurality of pixel samples that result from oversampling a pixel of the display. Preferably, the oversampling is performed in a predetermined manner as described with respect to FIG. 1 such that ordering of the samples reflects their importance to the validity of the sample set.

The frame buffer 36 stores a pixel array, where each element of the pixel array describes a particular pixel of the display. The compressed sample block 30 may be the processor on a graphics card where the sample memory 38 is the main memory of the system, or a portion thereof, that is accessed over an Accelerated Graphics Protocol (AGP) bus.

When the data, or samples, for a particular pixel can be reduced to a compressed sample set, the compressed sample set is stored in the frame buffer 36 in the element corresponding to the pixel which the compressed pixel set describes. When the pixel data corresponding to the pixel cannot be reduced to a compressed sample set, the pixel data is stored at a pixel entry of the sample memory 38, and a pointer to the pixel entry is stored in the frame buffer 36. The pointer to the pixel entry is stored in the element of the pixel array corresponding to the pixel that is described by the samples stored in the sample memory 38.

The compressed sample set of the apparatus of FIG. 2 is similar to the compressed sample set as described with regard to the method of FIG. 1. In other words, it may include one or more masks, and two or more color/Z pairs.

In order to store the pixel data sets in the sample memory 38, the compressed sample block 30 may use the counter 34 to determine the next address at which to store a pixel data set in the sample memory 38. The counter 34 indicates the next unused pixel entry of the sample memory 38, and after the next unused pixel entry is read by the compressed sample block 30, the counter 34 increments to produce the next unused entry. If each entry includes 32 bytes of storage space, the counter 34 may maintain only the upper address bits such that the counter 34 steps in 32-byte increments with respect to the sample memory 38. In other words, the value read from the counter 34 may be padded with a fixed set of bits on the least-significant end to form the complete address of the next unused pixel entry.

More preferably, the counter 34 maintains the least-significant bits and utilizes them in memory overflow situations to allow additional addresses to be used for storage of partial pixel data sets. As was described with respect to FIG. 1, if the memory allocation for storing the pixel data sets in the sample memory is inadequate to support the number of pixels in a frame that needs more than a compressed sample set, the number of samples stored per pixel may be reduced. Preferably, this is accomplished by determining when the counter 34 exceeds a maximum count that corresponds to the boundaries of the sample memory 38. When the maximum count is exceeded, a new address offset is established in the counter such that portions of pixel data sets already stored in the sample memory 38 are overwritten by portions of subsequent pixel data sets.

The new address offset to be established in the counter 34 is determined based on the current address offset. Repeating the example provided with respect to FIG. 1, if eight samples are initially stored per pixel, the address offset should be zero such that the base addresses for the entries in the sample memory 38 are used to store pixel data sets. If the maximum count is exceeded, the address offset is adjusted to four such that the latter half of all of the initial data sets stored are overwritten by subsequent four-sample data sets. The address offset can be used to determine the number of samples to store and retrieve in the memory for each pixel.

The apparatus may also include stack 32, which stores released pixel entries. As was described with respect to FIG. 1, when an incoming fragment later modifies a pixel, it may be changed such that it can be compressed. When this occurs, the compressed sample set for that pixel will be stored in the frame buffer 36, and the pixel entry that was being used in the sample memory 38 to store the pixel data set is free to be used to store another pixel data set. When this happens, the released pixel entry is pushed onto the stack 32.

When the compressed sample block 30 needs an unused entry in the sample memory 38, it first checks the stack 32. If there is released pixel entry on the stack 32, the compressed sample block 30 pops the released pixel entry from the stack 32 for use as the unused entry. If the stack is empty, the compressed sample block 30 reads the next unused entry from the counter 34.

Figure 3:
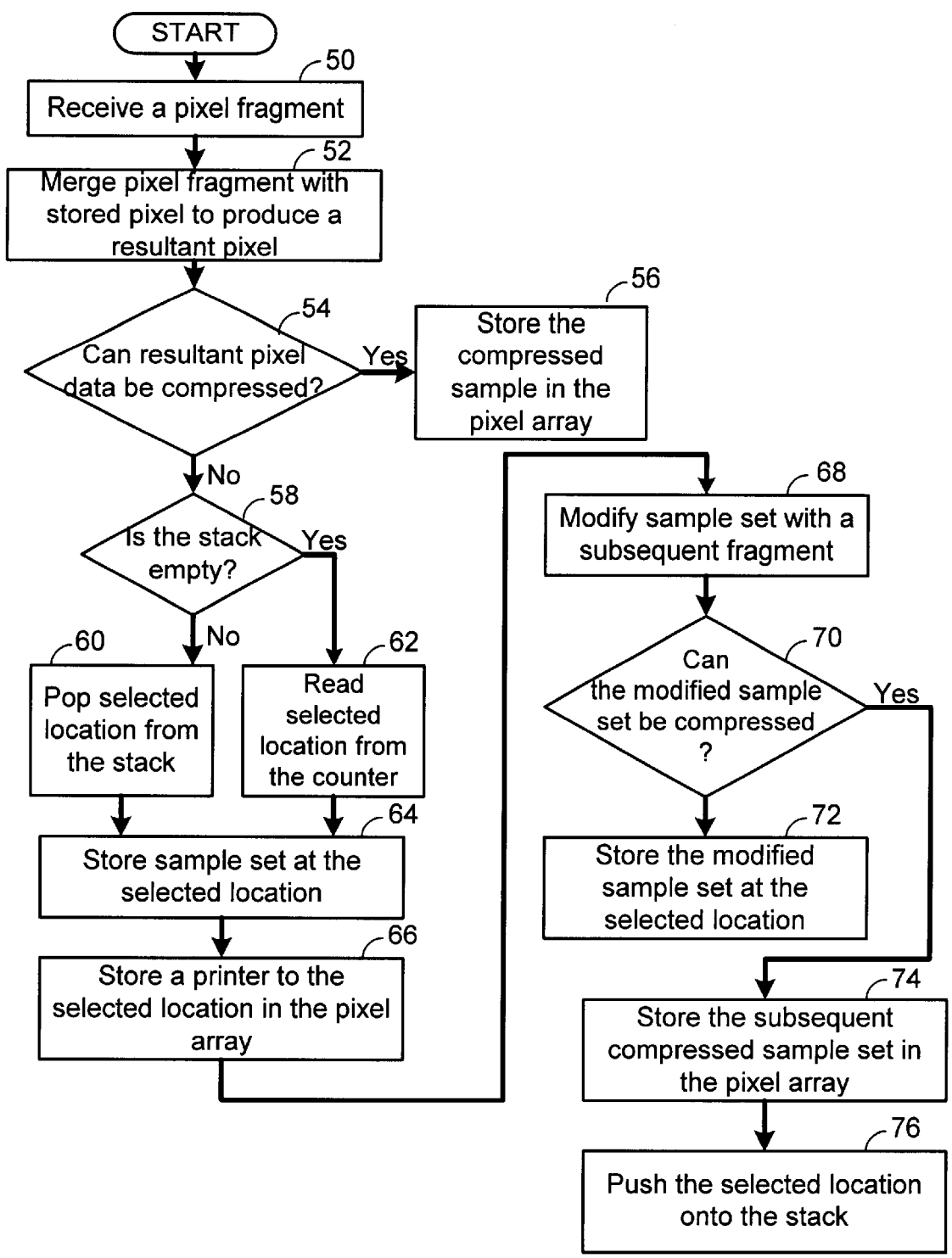
FIG. 3 illustrates a flow diagram of a method for antialiasing in accordance with the present invention.

FIG. 3 illustrates an antialiasing method that requires fewer memory resources than conventional oversampling schemes. At step 50, a pixel fragment is received that corresponds to a stored pixel in a pixel array. The pixel fragment is characterized by pixel fragment data that may modify the currently stored pixel data that characterizes the stored pixel. At step 52, the pixel fragment is merged with the stored pixel to produce a resultant pixel characterized by resultant pile data. At step 54, it is determined whether or not the resultant pixel data can be compressed into a compressed sample set. This determination is similar to that described in step 10 of FIG. 1.

If the resultant pixel data can be described using a compressed sample set, at step 56 the compressed sample set is stored in the pixel array. The compressed sample set may include first and second descriptors and a mask, where the mask indicates pixel coverage area of the two descriptors. A descriptor in such an embodiment includes a color value and a Z value. As described with respect to FIG. 1, the mask determines which descriptor provides the color and Z parameters for a specific sample of the pixel through the use of a binary mask. As before, a first binary value indicates the first descriptor and the second binary value indicates the second descriptor.

If the resultant pixel data cannot be adequately described with a compressed sample set, at least a portion of the complete sample set is stored in a selected location external to the pixel array, and a pointer to the location is stored in the pixel array. The sample set may be stored in system memory, or in another memory that may be slower than the memory that stores the pixel array. At step 58, it is determined if a stack is empty or if it contains the selected location to which the sample set will be stored. The stack stores released locations as described above. If the stack is non-empty and contains the selected location, the location is popped from the stack at step 60. If the stack is empty does not does not contain the selected location, the selected location is read from a counter at step 62.

Preferably, the counter includes an address offset that indicates the number of samples to be stored for each pixel. This offset can change when the memory allocated for storage of sample sets is filled. The offset is changed when the memory is filled to allow additional sample sets to be stored in such a way that portions of previously written sample sets are overwritten. This allows all sample sets requiring storage to be accommodated, but can cause some image degradation as a portion of the set of samples for each pixel are discarded. The techniques for adjusting the address offset of the counter and determining the number of samples to store in each sample set were discussed in more detail with respect to FIGS. 1, 2, 5 and 6 above.

At step 64, the sample set, or portion thereof, is stored at the selected location. The sample set may be stored as a plurality of samples, where the number of samples is fixed for each pixel. Each sample includes a color value and a Z value. In another embodiment, the sample set may be stored as a linked list, where the pointer stored in the pixel array points to the first member of the linked list. In a linked-list structure, each element of the list points to the next element in the list. This can allow for a flexible number of samples to be stored for each pixel rather than a fixed number.

At step 66, a pointer to the selected location is stored in the pixel array. As described above, the presence of a pointer in the pixel array may be indicated with a predetermined value in the mask portion of the pixel array entry. Because the pointer may not take up the same amount of space that is allocated in the pixel array for each compressed sample set, the unused space may be used to store the closest Z value of any of the samples in the sample set to which the pointer points. This can help facilitate the merger of subsequent fragments.

At this point, the resultant pixel data that was produced through the merger of the incoming fragment with the previously stored pixel data has been stored. In the case where the resultant pixel sample set could not be compressed, future modification to the pixel may change this status.

At step 68, a subsequent fragment modifies the sample set in the same manner as in steps 50 and 52. At step 70, it is determined whether the modified sample set can now be compressed into a compressed sample set. If not, at step 72 the modified sample set is stored at the selected location. In other words, the modified sample set simply replaces the previously existing sample set that was stored for this particular pixel. No updates to the pixel array are required.

At step 74, if it is determined that the modified sample set can be stored as a subsequent compressed sample set, the subsequent compressed sample set is stored in the pixel array. The subsequent compressed sample set will replace the pointer that was previously stored in the pixel array. When the pointer is replaced, the selected location to which it pointed is no longer in use, and this location is therefore free to be re-used. In order to facilitate re-use, at step 76 the selected location is pushed onto the stack. The next time that a location is required for storing an uncompressed sample set, this location can be popped from the stack and the selected location will be re-used. This reuse furthers the memory conservation aspects of the present invention.

Figure 4:
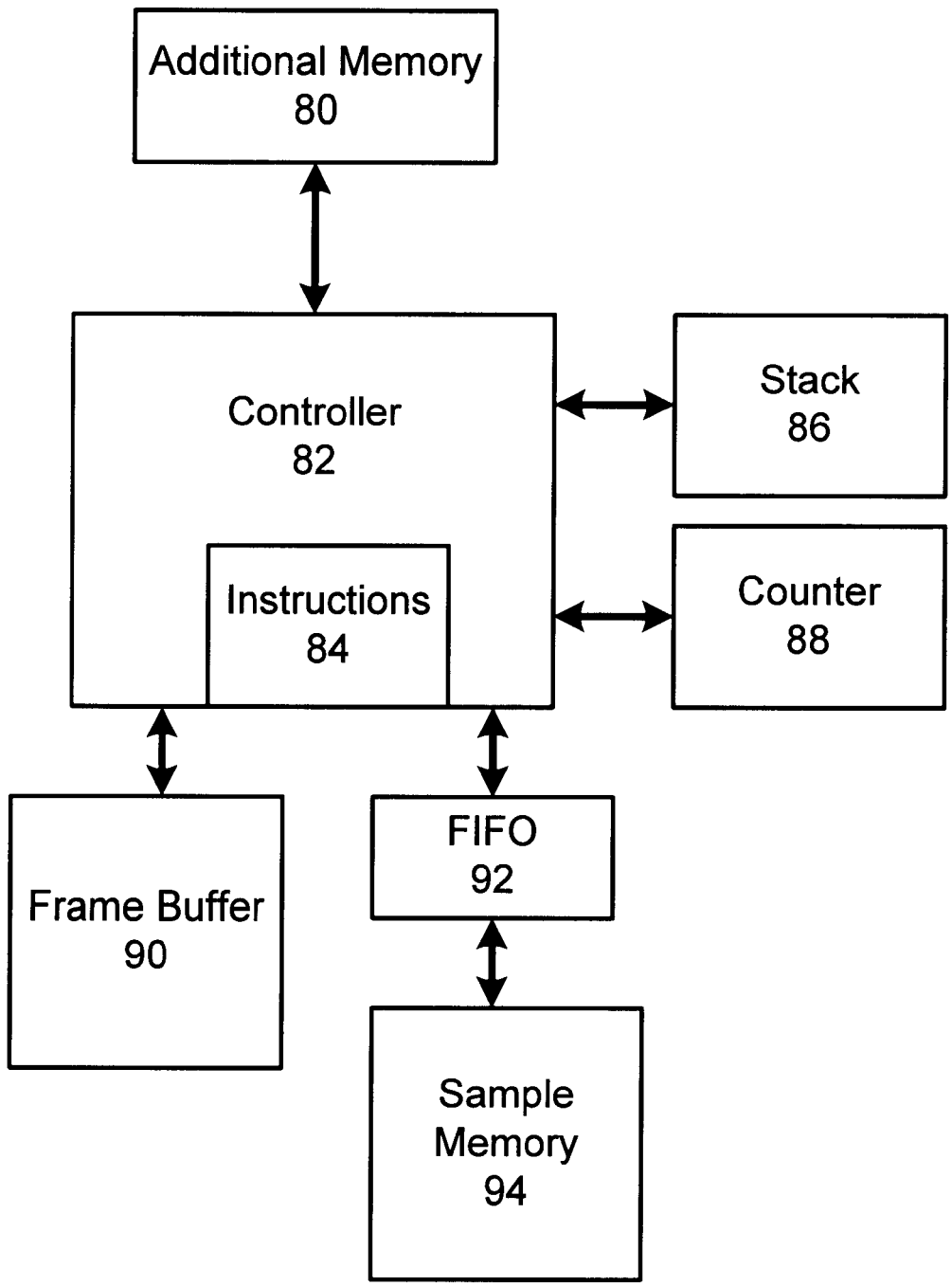
FIG. 4 illustrates a block diagram of an antialiasing video graphics processing system in accordance with the present invention.

FIG. 4 illustrates an antialiasing video graphics system that stores oversampling data in memory structures in such a way as to reduce the memory requirements that an oversampling system typically requires. The system includes a controller 82, a stack 86, a counter 88, a frame buffer 90, and a sample memory 94. The frame buffer 90 stores a two-descriptor array, where each pixel of the video graphics system has a corresponding element in the array. The frame buffer 90 may be fast memory which is local with respect to the controller 82.

The sample memory 94 stores a multi-sample array, where each element of the multi-sample array stores a predetermined number of samples. In a system that employs eight times oversampling of each pixel, each element of the multi-sample array initially stores eight samples, where each sample includes a color value and a Z value. It should be apparent that the multi-sample array may store a subset of the complete sample set produced by oversampling. In other words, the system may choose to forfeit some of the detail and only store four of the eight samples. This may be required if the sample memory 94 is not large enough to accommodate all of the pixels that cannot be compressed in a particular frame. The sample memory 94 may be memory that is not as fast as the frame buffer 90. This may include non-local memory, such as the main memory of a processor external to the video graphics card upon which the present video graphics system is implemented. In such an embodiment, the main memory may be accessed over a bus structure such as an AGP bus.

The next element counter 88 stores the location of the next free element in the sample memory 94. When the next element counter 88 is read for use, the next element counter 88 increments such that it continually points to the next free element of the sample memory 94. If the next element counter exceeds the boundaries of the sample memory, the counter is set to a new value having a different address offset such that previously written sample sets are partially overwritten as new sample sets for the current frame are stored. The stack 86 stores released locations, where a released location is an entry of the multi-sample array which was used at one time to store samples, but is no longer in use and can be re-used.

The controller 82 orchestrates the interaction between the components of the system. The controller 82 includes instructions 84 that are executed by the controller 82 and which cause the controller 82 to perform a predetermined function. The instructions 84 may be a software algorithm that is stored in memory internal or external to the controller 82. The function set performed by the controller 82 includes receiving a pixel fragment that corresponds to one of the pixels of the video graphics system. The received pixel fragment is merged with the pixel data that is already stored in the system to produce a resultant pixel. The data describing this resultant pixel, or resultant pixel data, is then stored in place of the previously stored data.

When the resultant pixel data can be described with a two-descriptor data set, which includes two color/Z pairs and a mask value, the two-descriptor data set is stored in the frame buffer 90. The two-descriptor data set is stored in a location of the frame buffer 90 that corresponds to the particular pixel that the resultant pixel data characterizes.

In the case where the resultant pixel data includes more than two color or Z values, a multi-sample data set is used to characterize the pixel. This multi-sample data set is stored in the sample memory 94. The location in the sample memory 94 at which the multi-sample data set is stored is determined by first checking if there is at least one released location on the stack 86. If there is, a released location is popped from the stack 86. If there is not, the next free element location is read from the counter 88. The number of samples to include in the multi-sample data set is determined based on the address offset indicated by the counter 88.

The controller 82 stores the multi-sample data set in the sample memory 94 at the location obtained from either the stack 86 or the counter 88. In order to utilize this data, a pointer is stored in the element of the two-descriptor array corresponding to the pixel that the multi-sample data set describes. The pointer points to the location of the sample memory 94 at which the multi-sample data set has been stored.

Because the sample memory 94 is typically slower than the frame buffer 90 and more memory operations are required to store a multi-sample data set than a two-descriptor element, the system can be slowed if it is forced to wait for read and write operations to and from the sample memory 94. In order to offload some of these operations, a First In First Out (FIFO) buffer 92 may be included in the system. The FIFO 92 buffers the stream of memory operations to the sample memory 94. This allows the controller 82 to perform other functions in the system while these memory operations are performed. By offloading some of the sample memory operations from the controller 82, overall system efficiency can be increased.

Software algorithms that cause a processor or controller to perform the functions of the methods illustrated herein may be stored in any manner of computer readable medium, including, but not limited to, a diskette, magnetic tape, ROM, RAM, a hard disk, or a CD-ROM. Execution of the software by a processor will cause the processor to operate in a specific and predetermined manner such that it performs the steps or functions required by the methods described above. In some embodiments, circuitry or hardware may perform some or all of the steps or functions, whereas other steps or functions are performed in software.

It should be understood that the implementation of other variations and modifications of the invention in its various aspects will be apparent to those of ordinary skill in the art, and that the invention is not limited by the specific embodiments described. For example, methods of compressing the sample set for a pixel may be used which result in some loss of information, where the loss is understood and tolerated by the system. It is therefore contemplated to cover by the present invention, any and all modifications, variations, or equivalents that fall within the spirit and scope of the basic underlying principles disclosed and claimed herein.

What is claimed is:

1. A method for storing antialiasing pixel data, the method comprising:

sampling a pixel in a predetermined manner to produce a pixel sample set, wherein the predetermined manner is such that absence of selected samples in the pixel sample set does not invalidate the pixel sample set as a representation of the pixel;

determining if the pixel sample set can be reduced to a compressed sample set;

when the pixel sample can be reduced to the compressed sample set, storing the compressed sample set in a first memory at a first memory location; and when the pixel sample set can not be reduced to the compressed sample set:
  determining a selected address in a second memory by;
    reading a counter; and
    determining if the counter has exceeded a memory address limit;
    when the counter has not exceeded the memory address limit, incrementing the counter by an increment step;
    when the counter has exceeded the memory address limit:
      determining a new address offset for the next available memory address based on a current address offset; and
      loading the counter with the next available memory address such that the new address offset becomes the current address offset;
  determining a storage portion of the pixel sample set based on the selected address, wherein the storage portion includes at least a portion of the pixel sample set, wherein samples included in the storage portion are determined based on the predetermined manner of sapling;

storing the storage portion of the pixel sample set in the second memory at the selected address; and storing a pointer to the selected address in the first memory location.

2. The method of claim 1 wherein storing the compressed sample set in the first memory further comprises:

storing a mask;

storing a first color and a first Z; and storing a second color and a second Z.

3. The method of claim 1, wherein storing the compressed sample set in the first memory further comprises:

storing a first color and a first Z;

storing a second color and a second Z;

storing a third color and a third Z;

storing a first mask, wherein the first mask corresponds to the first color and the first Z; and storing a second mask, wherein the second mask corresponds to the second color and the second Z, and wherein a combination of the first mask and the second mask corresponds to the third color and the third Z.

4. The method of claim 1, wherein the step of determining the selected memory address further comprises:

incrementing the counter such that the counter indicates a next available memory address.

5. The method of claim 1, wherein determining a new address offset further comprises determining a new address offset such that addresses produced by the counter result in a storage portions determined for subsequent pixel sample sets for storage in the second memory are one-half as large as storage portions determined for pixel sample sets based on the current address offset.

6. The method of claim 5 further comprises:

when data corresponding a pixel represented by samples in the second memory is required:

determining a valid storage portion for a pixel sample set corresponding to the pixel based on the current address offset; and reading the valid storage portion of the pixel sample set from the second memory based on a pointer stored in the first memory corresponding to the pixel.

7. An apparatus for display antialiasing comprising:

a sample memory, wherein the sample memory stores a plurality of pixel entries, wherein each pixel entry of the plurality of pixel entries includes a plurality of pixel samples;

a frame buffer operably coupled to the sample memory, wherein the frame buffer stores a pixel array, wherein each element of the pixel array describes a pixel of the display, wherein when pixel data corresponding to a pixel of the pixel array can be reduced to a compressed sample set, the compressed sample set is stored in an element of the pixel array corresponding to the pixel, and when pixel data corresponding to the pixel requires more pixel samples than the compressed sample set to describe the pixel, a pointer to a pixel entry of the sample memory is stored in the element of the pixel array, wherein at least a portion the pixel data corresponding to the pixel is stored in the pixel entry;

a counter that indicates an unused pixel entry of the sample memory, wherein when the counter exceeds a maximum count, the counter adjusts a current address offset value to a new address offset value, wherein the current address offset value corresponds to an address offset of subsequent pixel entries in the sample memory, wherein the new address offset value is determined based on the current address offset value; and a compressed sample block operably coupled to the frame buffer, the sample memory, and the counter, wherein the compressed sample block determines whether pixel data sets can be summarized in compressed sample sets, wherein the compressed sample block controls storage of pixel data in the frame buffer and the sample memory, wherein when pixel data is to be stored in the sample memory, the compressed sample block utilizes the current address offset value of the counter to determine a number of samples of the pixel data that are stored in the sample memory.

8. The apparatus of claim 7, wherein the compressed sample set further comprises a mask, a first color, a first Z, a second color, and a second Z.

9. The apparatus of claim 7, wherein the compressed sample set further comprises:

a first color;

a first Z;

a second color;

a second Z;

a third color;

a third Z;

a first mask corresponding to the first color and the first Z; and a second mask corresponding to the second color and the second Z, wherein a combination of the first mask and the second mask corresponds to the third color and the third Z.

10. A method for antialiasing comprising:

receiving a pixel fragment corresponding to a stored pixel in a pixel array, wherein the pixel fragment is characterized by pixel fragment data, and wherein the stored pixel is characterized by stored pixel data;

merging the pixel fragment with the stored pixel to produce a resultant pixel, wherein the resultant pixel is characterized by resultant pixel data;

storing the resultant pixel data, wherein storing includes:

when the resultant pixel data can be described with a compressed sample set, storing the compressed sample set in the pixel array;

when the resultant pixel data cannot be described with a compressed sample set:

reading a counter value to determine a memory address, wherein the memory address has a base memory address offset;

storing a sample set representing the resultant pixel data at the memory address, wherein samples in the sample set are determined based on the base memory address offset;

when the counter value is within memory boundaries, incrementing the counter value to correspond to a next memory address;

when the counter value exceeds memory boundaries, setting the counter value to a value that corresponds to a new memory address having a new base memory address offset;

storing a pointer in the pixel array, wherein the pointer points to the sample set.

11. The method of claim 10, wherein storing the sample set further comprises:

storing a selected number of samples, wherein each sample of the selected number of samples includes a color value and a Z value, wherein the selected number is determined based on the base memory address offset.

12. The method of claim 11, wherein storing the compressed sample set in the pixel array further comprises:
storing a first descriptor, wherein the first descriptor includes a first color value and a first Z value;
storing a second descriptor, wherein the second descriptor includes a second color value and a second Z;
storing a mask, wherein the mask indicates pixel coverage area of the first descriptor and the second descriptor.

13. The method of claim 12, wherein storing the mask further comprises storing the mask such that when the mask is represented in binary format, a first binary value indicates sample coverage of the first descriptor and a second binary value indicates sample coverage of the second descriptor.

14. The method of claim 13, wherein when the pointer is stored in the pixel array, presence of the pointer is indicated by a predetermined value in a portion of the pixel array corresponding to the mask of the stored pixel.

15. An antialiasing video graphics system, comprising:
a frame buffer that stores a two-descriptor array, wherein each pixel of the video graphics system has a corresponding element in the two-descriptor array;
a sample memory that stores a multi-sample array, wherein each element of the multi-sample array stores a predetermined number of samples;
a next element counter, wherein the next element counter stores a next free element location of the multi-sample array, wherein the predetermined number of samples stored for each element of the multi-sample array is determined based on the next free element location;
a controller operably coupled to the frame buffer, the sample memory, and the next element counter, wherein the controller includes instructions, wherein when the instructions are executed by the controller, the controller performs the steps of:
receiving a pixel fragment that corresponds to a pixel of the video graphics system;
merging the pixel fragment with pixel data corresponding to the pixel to produce a resultant pixel, wherein the resultant pixel is characterized by resultant pixel data; and
storing the resultant pixel data, wherein storing includes:
when the resultant pixel data can be described with a two-descriptor data set, storing the two-descriptor data set in the frame buffer in the element of the two-descriptor array corresponding to the pixel; and
when the resultant pixel data requires a multi-sample data set:
retrieving the sample memory element address from the next element counter, wherein retrieving includes incrementing the next element counter;
determining the predetermined number of samples to include in the multi-sample data set based on the sample memory element address;
storing the multi-sample data set at the sample memory element address in the sample memory; and
storing a pointer in the frame buffer in the element of the two-descriptor array corresponding to the pixel, wherein the pointer points to the multi-sample data set.

16. The antialiasing video graphics system of claim 15, wherein a two-descriptor data set includes a mask, a first color, a first Z, a second color, and a second Z.

17. The antialiasing video graphics system of claim 15 further comprises a buffer operably coupled to the controller and the sample memory, wherein the controller uses the buffer to offload sample memory operations.

18. The antialiasing video graphics system of claim 15 further comprises a stack operably coupled to the controller, wherein the stack stores released locations corresponding to released multi-sample entries, wherein when the resultant pixel data requires a multi-sample data set and the stack includes a released entry, the released entry is popped from the stack and used as the sample memory element address rather than retrieving the sample memory address from the next element counter, wherein the next free element location in the next element counter is used to determine the number of samples in the multi-sample data set stored at the sample memory address in the sample memory.

19. The antialiasing video graphics system of claim 18, wherein when the next element counter is incremented to produce a subsequent free element location, it is determined whether the free element location exceeds boundaries of the sample memory, wherein when boundaries of the sample memory are exceeded, the free element location is set to a value within the boundaries of the sample memory, wherein the value has an offset that differs from an offset of previous free element locations generated by the next element counter for a current frame.

* * * * *